US011305908B2

(12) United States Patent
Burkett, Jr. et al.

(10) Patent No.: US 11,305,908 B2
(45) Date of Patent: Apr. 19, 2022

(54) TABLET COUNTER AND PACKAGING MODULE AND ASSOCIATED METHOD

(71) Applicant: Aylward Enterprises, LLC, New Bern, NC (US)

(72) Inventors: Jeffrey L. Burkett, Jr., Kinston, NC (US); William F. Clukey, Jr., Jacksonville, NC (US); Vincent E. Holley, Greenville, NC (US); John A. Winters, Winston Salem, NC (US)

(73) Assignee: Aylward Enterprises, LLC, New Bern, NC (US)

( * ) Notice: Subject to any disclaimer, the term of this patent is extended or adjusted under 35 U.S.C. 154(b) by 93 days.

(21) Appl. No.: 17/024,298

(22) Filed: Sep. 17, 2020

(65) Prior Publication Data

US 2021/0086934 A1 Mar. 25, 2021

Related U.S. Application Data

(60) Provisional application No. 62/903,160, filed on Sep. 20, 2019.

(51) Int. Cl.
*B65B 57/20* (2006.01)
*B65B 57/14* (2006.01)
(Continued)

(52) U.S. Cl.
CPC .................. *B65B 57/20* (2013.01); *A61J 7/02* (2013.01); *B65B 1/10* (2013.01); *B65B 5/103* (2013.01);
(Continued)

(58) Field of Classification Search
CPC .. B65B 1/10; B65B 1/16; B65B 5/103; B65B 35/08; B65B 35/26; B65B 35/28;
(Continued)

(56) References Cited

U.S. PATENT DOCUMENTS

| 422,364 | A | 3/1890 | Bateson |
| 792,918 | A | 6/1905 | Ohlendorf et al. |

(Continued)

FOREIGN PATENT DOCUMENTS

| CA | 2203856 | 10/1998 | |
| JP | 60039283 A | * 3/1985 | .............. G06M 7/00 |

(Continued)

*Primary Examiner* — Stephen F. Gerrity
(74) *Attorney, Agent, or Firm* — Ward and Smith, P.A.; Ryan K. Simmons

(57) ABSTRACT

A tablet counter and packaging module including a rotary disc with tablet apertures spaced thereabout, the tablet apertures configured to receive a tablet; a negative pressure system configured to retain the tablets in the tablet apertures; ejection devices to selectively eject one or more of the tablets from the corresponding tablet apertures; a plurality of ejection receptacles configured to collect the tablets ejected by the ejection devices; an inspection system operably engaged with the rotary disc and at least one of the ejection devices, the inspection system being configured to analyze tablets retained within the tablet apertures to determine if one or more tablet characteristics associated with the tablet; and the ejection devices configured to eject the tablet from a tablet aperture based on the determined at least one tablet characteristic.

28 Claims, 11 Drawing Sheets

(51) Int. Cl.
  *B65B 1/10* (2006.01)
  *B65B 59/04* (2006.01)
  *B65B 5/10* (2006.01)
  *B65B 37/08* (2006.01)
  *B65B 65/08* (2006.01)
  *A61J 7/02* (2006.01)

(52) U.S. Cl.
  CPC .............. *B65B 37/08* (2013.01); *B65B 57/14* (2013.01); *B65B 59/04* (2013.01); *B65B 65/08* (2013.01)

(58) Field of Classification Search
  CPC ......... B65B 35/46; B65B 35/48; B65B 37/08; B65B 57/14; B65B 57/20; B65B 59/04; B65B 65/08; G06M 7/00
  USPC .................... 53/54, 495, 498, 499, 500, 501
  See application file for complete search history.

(56) References Cited

U.S. PATENT DOCUMENTS

| | | | |
|---|---|---|---|
| 1,383,623 A | 7/1921 | Groves | |
| 1,775,141 A | 9/1930 | Risser | |
| 1,824,432 A | 9/1931 | Hendry | |
| 1,839,327 A | 1/1932 | Mayo | |
| 2,094,460 A | 9/1937 | McBean et al. | |
| 2,479,667 A | 8/1949 | Boylan | |
| 2,585,558 A | 2/1952 | Lakso | |
| 2,742,184 A | 4/1956 | Yerkes et al. | |
| 2,845,759 A | 8/1958 | Cote et al. | |
| 3,028,713 A | 4/1962 | Kennedy et al. | |
| 3,139,713 A | 7/1964 | Merrill et al. | |
| 3,206,062 A | 9/1965 | Rappaport | |
| 3,225,513 A | 12/1965 | Ehe | |
| 3,354,607 A | 11/1967 | Lakso | |
| 3,387,695 A | 6/1968 | Hendrickson | |
| 3,412,908 A | 11/1968 | Ferrault | |
| 3,417,542 A | 12/1968 | Merrill et al. | |
| 3,677,437 A | 7/1972 | Haigler | |
| 3,722,740 A | 3/1973 | List | |
| 3,782,590 A | 1/1974 | Apfel | |
| 3,796,346 A | 3/1974 | Ribouleau | |
| 3,837,139 A | 9/1974 | Roseberg | |
| 3,925,960 A | 12/1975 | Saari et al. | |
| 3,979,878 A | 9/1976 | Berney | |
| 3,986,636 A | 10/1976 | Hoppmann et al. | |
| 4,017,003 A | 4/1977 | Heino | |
| 4,047,637 A | 9/1977 | Grunstad et al. | |
| 4,094,129 A | 6/1978 | List | |
| 4,094,439 A | 6/1978 | List | |
| 4,154,681 A | 5/1979 | Shields et al. | |
| 4,231,462 A | 11/1980 | Ackley et al. | |
| 4,265,072 A | 5/1981 | Egli | |
| 4,308,942 A | 1/1982 | Ackley | |
| 4,449,642 A | 5/1984 | Dooley | |
| 4,674,259 A | 6/1987 | Hills | |
| 4,677,283 A | 6/1987 | Lewis | |
| 4,697,721 A | 10/1987 | Johnson et al. | |
| 5,085,510 A | 2/1992 | Mitchell | |
| 5,463,839 A | 11/1995 | Stange et al. | |
| 5,515,668 A | 5/1996 | Hunt et al. | |
| 5,638,657 A | 6/1997 | Archer et al. | |
| 5,787,825 A | 8/1998 | Yaji et al. | |
| 6,079,284 A * | 6/2000 | Yamamoto et al. | G01N 21/9508 73/865.8 |
| 6,185,901 B1 | 2/2001 | Aylward | |
| 6,266,946 B1 | 7/2001 | Aylward | |
| 6,269,612 B1 | 8/2001 | Aylward | |
| 6,401,429 B2 | 6/2002 | Aylward | |
| 6,422,418 B1 | 7/2002 | Collins et al. | |
| 6,434,911 B1 * | 8/2002 | Yamamoto et al. | B65G 47/256 53/53 |
| 6,505,460 B2 | 1/2003 | Aylward | |
| 6,561,377 B1 | 5/2003 | Pearson et al. | |
| 6,631,826 B2 | 10/2003 | Pollard et al. | |
| 6,681,550 B1 | 1/2004 | Aylward | |
| 6,741,731 B1 | 5/2004 | Yamamoto et al. | |
| 6,799,413 B2 | 10/2004 | Aylward | |
| 7,004,353 B2 * | 2/2006 | Yamamoto et al. | B65B 57/20 221/277 |
| 7,255,247 B2 | 8/2007 | Aylward | |
| 7,299,606 B2 | 11/2007 | Bonatti et al. | |
| 7,392,640 B2 * | 7/2008 | Vasquali | B65B 5/103 53/247 |
| 8,424,274 B2 | 4/2013 | Aylward et al. | |
| 2001/0045081 A1 | 11/2001 | Aylward | |
| 2004/0011806 A1 | 1/2004 | Luciano et al. | |
| 2004/0128955 A1 | 7/2004 | Aylward | |
| 2005/0217208 A1 | 10/2005 | Cicognani | |
| 2006/0006190 A1 | 1/2006 | Janet et al. | |
| 2006/0180234 A1 | 8/2006 | Aylward | |
| 2006/0201781 A1 | 9/2006 | Kodera | |
| 2007/0289660 A1 | 12/2007 | Aylward | |
| 2009/0044495 A1 | 2/2009 | Aylward | |
| 2009/0094947 A1 | 4/2009 | Aylward | |
| 2010/0303738 A1 * | 12/2010 | Ream et al. | A21D 13/47 426/87 |
| 2015/0274339 A1 * | 10/2015 | An et al. | B65B 9/00 53/493 |
| 2019/0083361 A1 * | 3/2019 | Imai et al. | A61J 3/00 |
| 2021/0086934 A1 | 3/2021 | Burkett, Jr. et al. | |

FOREIGN PATENT DOCUMENTS

| | | |
|---|---|---|
| WO | 94/15859 | 7/1994 |
| WO | 03/097459 A | 11/2003 |

* cited by examiner

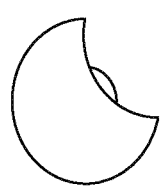
DEFECTIVE TABLET
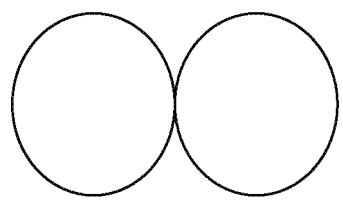
DOUBLE TABLETS
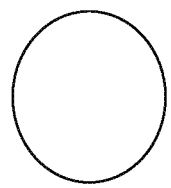
GOOD TABLET
NO TABLET
FIG. 11

TABLET COUNTER AND PACKAGING MODULE AND ASSOCIATED METHOD

RELATED APPLICATIONS

This application is related and claims priority to U.S. Patent Application No. 62/903,160, filed Sep. 20, 2019, entitled "Tablet Counter and Packaging Module", the entire disclosure of which is incorporated herein by reference.

TECHNICAL FIELD

The presently disclosed subject matter relates generally to tablet packaging and more particularly to a tablet counter and packaging module.

BACKGROUND

Most tablet counters on the market cannot reject defective or broken tablets on the fly and/or ensure 100% count accuracy without slowing down bottle filling speed. Therefore, there is a need in the pharmaceutical market for a tablet counter and packaging system that has higher count accuracy (e.g., 100%), are economically affordable, have a smaller footprint, and ability to quickly and easily increase counting and packaging speeds.

SUMMARY

In one embodiment, a tablet counter and packaging module is provided. The tablet counter and packaging module may include a rotary disc rotatable in a rotational direction about a first axis extending through a center thereof, the rotary disc may include tablet apertures (vacuum holes) spaced about an outer periphery of a surface of the rotary disc, each of the tablet apertures being configured to receive a tablet from a plurality of tablets disposed adjacent to the peripheral surface of the rotary disc; a negative pressure system operably engaged with the rotary disc and in fluid communication with one or more of the tablet apertures, the negative pressure system configured to apply a negative pressure to the one or more tablet apertures so as to retain the tablets therein as the rotary disc rotates about the first axis; a plurality of ejection devices, each ejection device being operably engaged with the rotary disc and configured to be in communication with the tablet apertures thereof at a respective angular position so as to selectively eject one or more of the tablets from the corresponding tablet apertures outwardly at the respective angular position of the ejection device; a plurality of ejection receptacles configured to collect the tablets ejected by respective ones of the ejection devices from the plurality of tablet apertures of the rotary disc; an inspection system, including one or more inspection devices (e.g., cameras) operably engaged with the rotary disc and at least one of the ejection devices, each of the one or more inspection devices being configured to analyze each of the tablets retained within the plurality of tablet apertures, wherein analyzing a tablet comprises determining one or more tablet characteristics associated with the tablet; and wherein the ejection devices are configured to selectively eject the analyzed tablet from a corresponding tablet aperture of the rotary disc based at least in part on the at least one tablet characteristics associated with the at least one tablet. The plurality of ejection devices may include a first ejection device configured to be in communication with the tablet apertures at an angular position of the rotary disc so as to selectively eject one or more of the tablets from the corresponding tablet apertures; and a second ejection device configured to be in communication with the tablet apertures at an angular position of the rotary disc spaced from the first ejection device so as to selectively eject one or more of the tablets from the corresponding tablet apertures; a third ejection device configured to be in communication with the tablet apertures at an angular position of the rotary disc spaced from the first and second ejection devices so as to selectively eject one or more of the tablets from the corresponding tablet apertures; and wherein the inspection devices are disposed at an angular position being rotationally upstream from the first, second, and third ejection devices, and wherein the ejection devices are configured to selectively eject one or more of the tablets based at least in part on the at least one tablet characteristics respectively associated with each of the one or more tablets. The at least one tablet characteristic may include a first tablet characteristic, a second tablet characteristic, and a third tablet characteristic, and wherein the first ejection device may be configured to eject tablets including the first tablet characteristic, the second ejection device may be configured to eject tablets including the second tablet characteristic, and the third ejection device may be configured to eject tablets including the third tablet characteristic. The first tablet characteristic may include a first unacceptable tablet characteristic, the second tablet characteristic may include a second unacceptable tablet characteristic, and the third tablet characteristic may include an acceptable tablet characteristic; wherein a tablet may be associated with the first unacceptable tablet characteristic based on a determination by the inspection system that the tablet comprises multiple tablets in a single tablet aperture, wherein a tablet may be associated with the second unacceptable tablet characteristic based on a determination by the inspection system that the tablet may include one or more of a defective, unidentifiable, or broken/chipped tablet characteristic, and wherein a tablet may be associated with the acceptable tablet characteristic based at least in part on a determination by the inspection system that the tablet may include a single whole tablet, unbroken, and identifiable tablet characteristic. The plurality of ejection receptacles may include a collection mechanism, the collection mechanism may be configured to collect the tablets ejected by the third ejection device and to direct the tablets toward a single one of the series of containers for deposition therein. The plurality of ejection receptacles may include at least one a reject container, the reject container may be configured to collect a tablet ejected by the second ejection device. The at least one of the plurality of ejection receptacles may be configured to direct at least a tablet ejected by the first ejection device back to the plurality of tablets disposed adjacent to the peripheral surface of the rotary disc. The rotary disc may be configured such that the plurality of tablet apertures is arranged about an outer peripheral surface portion thereof. The negative pressure system may be configured to simultaneously apply a negative pressure to the plurality of tablet apertures located at least between the inspection devices and the first, second, and third ejection devices so as to retain the tablets therein, as the rotary disc rotates about the first axis. Each of the ejection devices may be in communication with at least one of the plurality tablet apertures about a respective angular position and configured to receive positively pressurized air and to selectively emit the air to the tablet apertures of the rotary disc at the respective angular position, the air being emitted at a positive pressure capable of overcoming the negative pressure retaining the tablets within the plurality of tablet apertures, so as to selectively eject one or more of the tablets from the corresponding tablet apertures toward an ejection receptacle disposed about the respective angular position corresponding to the ejection device. The tablet counter and packaging module may further include at least one counting device, wherein both the at least one counting device and the inspection system may be configured to count a number of tablets ejected from the plurality of ejection devices so as to verify that the number of tablets ejected from the plurality of ejection devices matches the predetermined amount of tablets to be selectively deposited into the one or more containers. The apparatus may further be configured to count a number of tablets ejected from the plurality of ejection devices including the first tablet characteristic, a number of tablets ejected from the plurality of ejection devices including the second characteristic, and a number of tablets ejected from the plurality of ejection devices including the third characteristic. The first axis may be substantially horizontally disposed, and wherein the apparatus may be further configured to deliver a selected amount of tablets to at least one container via the ejection receptacles, the at least one container being moved into coincidence with an ejection receptacle of the plurality of ejection receptacles by a conveying device. The tablet counter and packaging module may further include a tablet verification sensor configured to verify a tablet ejected by the third ejection device was deposited in its intended container. Each tablet counter and packaging module may be configured to operate as a single module or linearly with one or more additional tablet counter and packaging modules. The tablet counter and packaging module may be disposed on a movable platform configured for allowing movement of the tablet counter and packaging module as a whole with little to no modification and/or disassembly.

In another embodiment, a method of using tablet counter and packaging module is provided. The method may include receiving a tablet in at least one tablet aperture of a plurality of tablet apertures defined about an outer periphery of a surface of a rotary disc configured to rotate in a rotational direction about a first axis extending through a center thereof, each of the plurality of tablet apertures being configured to receive a tablet from a plurality of tablets disposed adjacent to the outer peripheral surface of the rotary disc; applying a negative pressure to the plurality of tablet apertures with a negative pressure system operably engaged with the rotary disc and in fluid communication with one or more of the tablet apertures, the negative pressure system configured to apply a negative pressure to the one or more tablet apertures so as to retain the tablets therein as the rotary disc rotates about the first axis; analyzing each tablet respectively retained within the at least one tablet apertures to determine one or more tablet characteristic associated with the tablet; selectively ejecting a tablet from a corresponding tablet aperture of the rotary disc based at least in part on one or more tablet characteristics associated with the tablet, the tablet being ejected by at least one ejection device of a plurality of ejection devices, the at least one ejection device being operably engaged with the outer peripheral surface portion of the rotary disc and configured to be in communication with at least one of the tablet apertures about a respective angular position; collecting the tablets ejected from the plurality of tablet apertures of the rotary disc with a plurality of ejection receptacles configured to direct the tablets toward one or more containers of a series of containers for deposition therein; and determining at least a portion of an amount of tablets ejected by each of the plurality of ejection devices. Selectively ejecting a tablet from a corresponding tablet aperture based at least in part on one or more tablet characteristics associated with the tablet may include selectively ejecting a tablet determined to include a first tablet characteristic from a corresponding tablet aperture by a first ejection device of the plurality of ejection devices, the first ejection device configured to be in communication with the tablet apertures about the respective angular position; selectively ejecting a tablet determined to include a second tablet characteristic from a corresponding tablet aperture by a second ejection device of the plurality of ejection devices, the second ejection device configured to be in communication with the tablet apertures at the respective angular position; selectively ejecting a tablet determined to include a third tablet characteristic from a corresponding tablet aperture by a third ejection device of the plurality of ejection devices, the third ejection device configured to be in communication with the tablet apertures at the respective angular position; and wherein the at least one tablet characteristic includes a first tablet characteristic, a second tablet characteristic, and/or a third tablet characteristic, wherein tablets including the first tablet characteristic may be ejected by the first ejection device, tablets including the second tablet characteristic may be ejected by the second ejection device, and tablets including the third tablet characteristic may be ejected by the third ejection device. The first tablet characteristics may include a first unacceptable tablet characteristic, the second tablet characteristics may include a second unacceptable tablet characteristic, and the third tablet characteristic may include an acceptable tablet characteristic; wherein a tablet may be associated with the first unacceptable tablet characteristic based on a determination by the inspection system that the tablet comprises multiple tablets in a single tablet aperture, wherein a tablet may be associated with the second unacceptable tablet characteristic based on a determination by the inspection system that the tablet comprises one or more of a defective, unidentifiable, or broken/chipped tablet characteristic, and wherein a tablet may be associated with the acceptable tablet characteristic based at least in part on a determination by the inspection system that the tablet does not comprise any of the first or second unacceptable tablet characteristics. The plurality of ejection receptacles may include at least one collection mechanism, the at least one collection mechanism being configured to collect the tablets ejected by the third ejection device and to direct the tablets toward a single one of a series of containers for deposition therein. The plurality of ejection receptacles may include at least one collection mechanism, the at least one collection mechanism being configured to collect the tablets ejected by the second ejection device and to direct the tablets toward a reject container for deposition therein. The plurality of ejection receptacles may include at least one collection mechanism, the at least one collection mechanism being configured to direct the tablets ejected by the first ejection device back to the plurality of tablets disposed adjacent to the outer peripheral surface of the rotary disc. Receiving a tablet in at least one tablet aperture of the plurality of tablet apertures may include receiving at least one tablet in a plurality of tablet apertures defined in at least a row spaced about the outward peripheral surface of the rotary disc. Applying a negative pressure to the plurality of tablet apertures further may include simultaneously applying a negative pressure to the plurality of tablet apertures with the negative pressure system located at least between one or more inspection devices and the first, second, and third ejection devices, wherein the one or more inspection devices may be disposed upstream from the first, second, and third ejection devices. Selectively ejecting a tablet of the at least one tablets from a corresponding tablet aperture may include receiving positively pressurized air at an ejection device in communication with at least one of the tablet apertures about a respective angular position, and selectively emitting the air to at least one of the tablet apertures at the respective angular position, the air being emitted at a positive pressure capable of overcoming the negative pressure retaining the tablets within the plurality tablet apertures, so as to selectively eject one or more of the tablets from the corresponding tablet aperture toward an ejection receptacle disposed about the respective angular position corresponding to the ejection device. The method may further include verifying, via a tablet verification sensor, that the tablets ejected by the third ejection device were deposited in their intended container. The method may further include adding one or more additional tablet counter and packaging modules linearly to a bottle fill line. The method may further include the tablet counter and packaging module being disposed on a movable platform configured for allowing movement of the tablet counter and packaging module as a whole with little to no modification and/or disassembly.

BRIEF DESCRIPTION OF THE DRAWINGS

Figure 1:
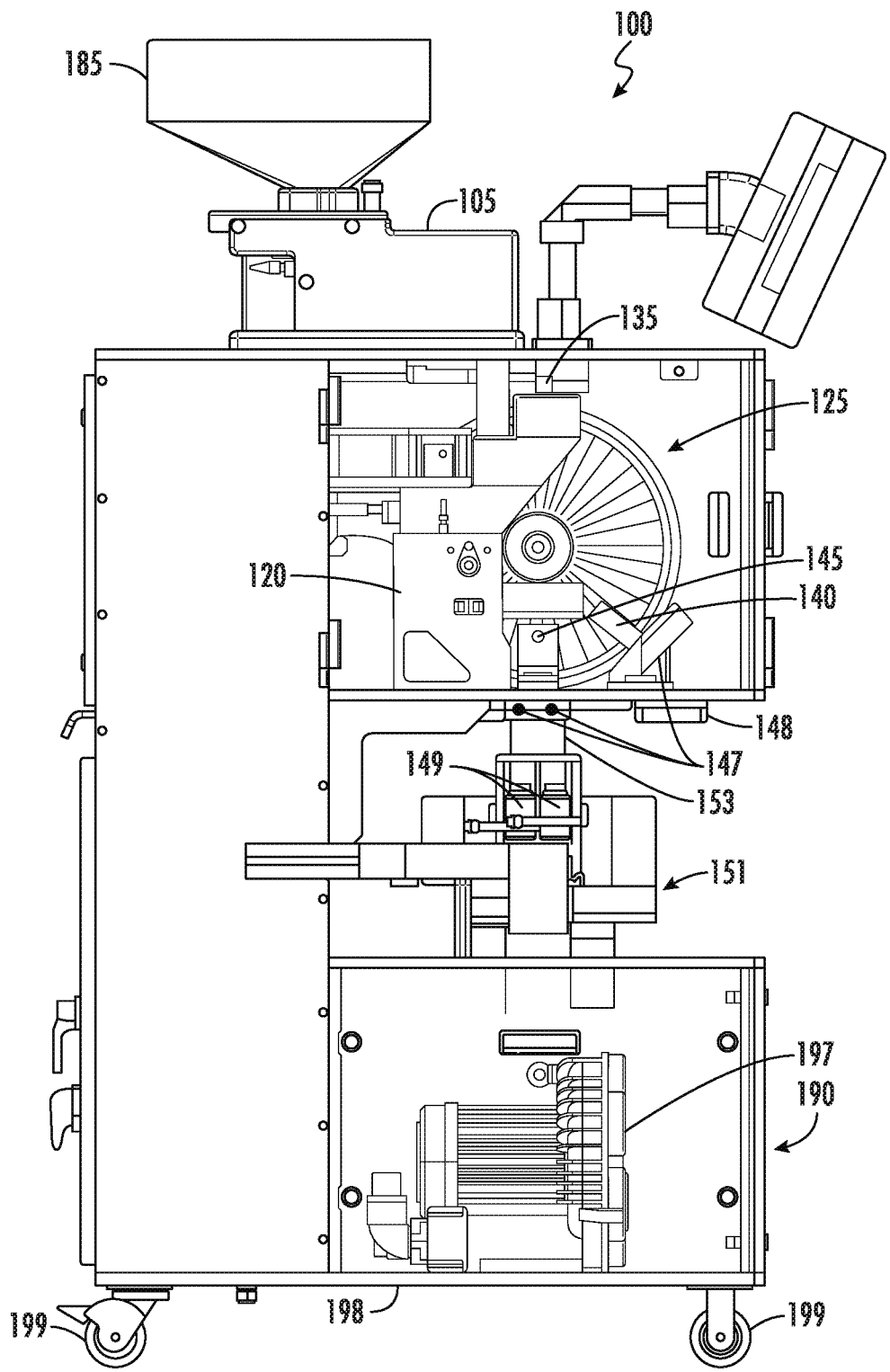
Figure 2:
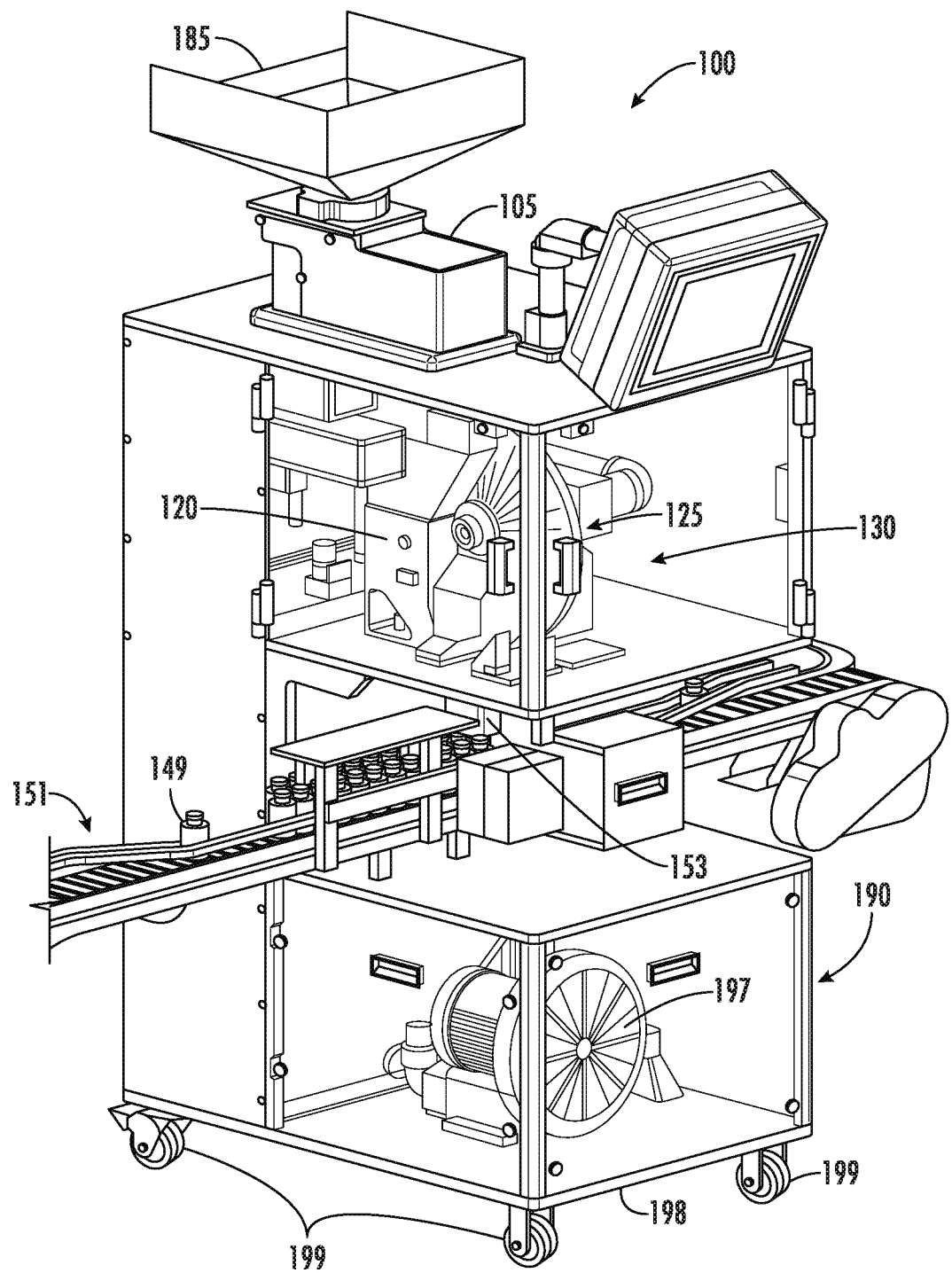
Figure 3:
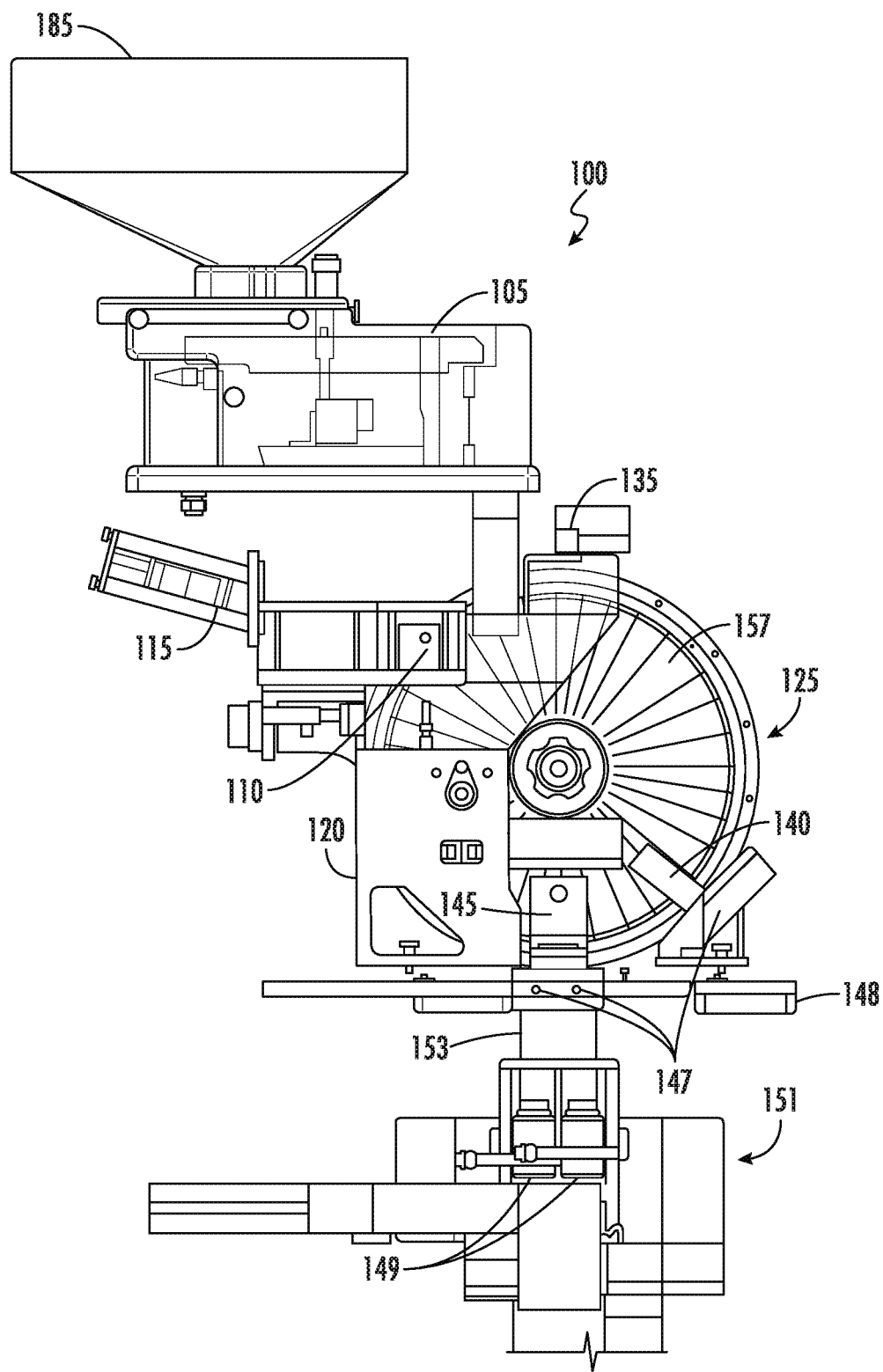
Figure 4:
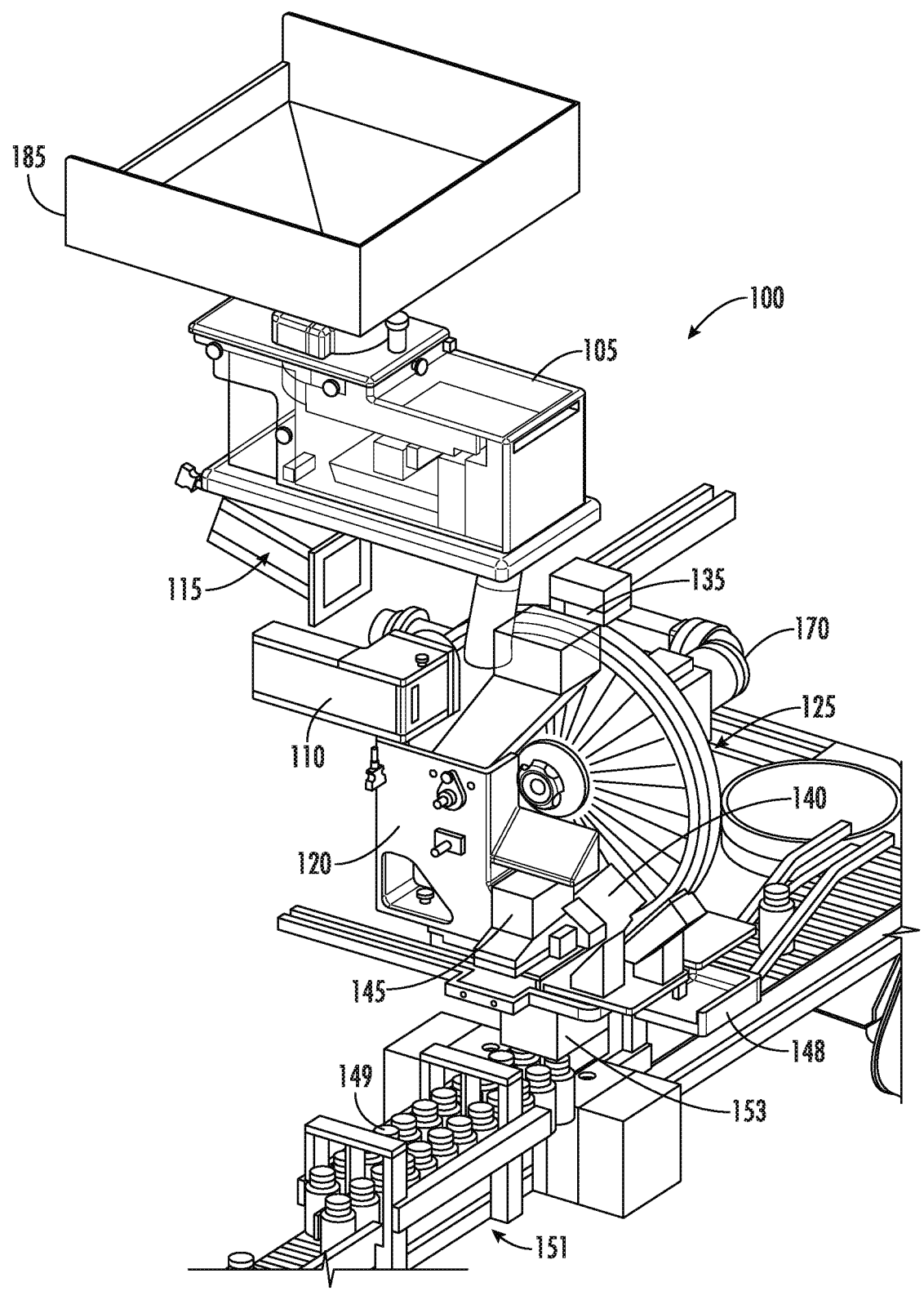
Figure 5:
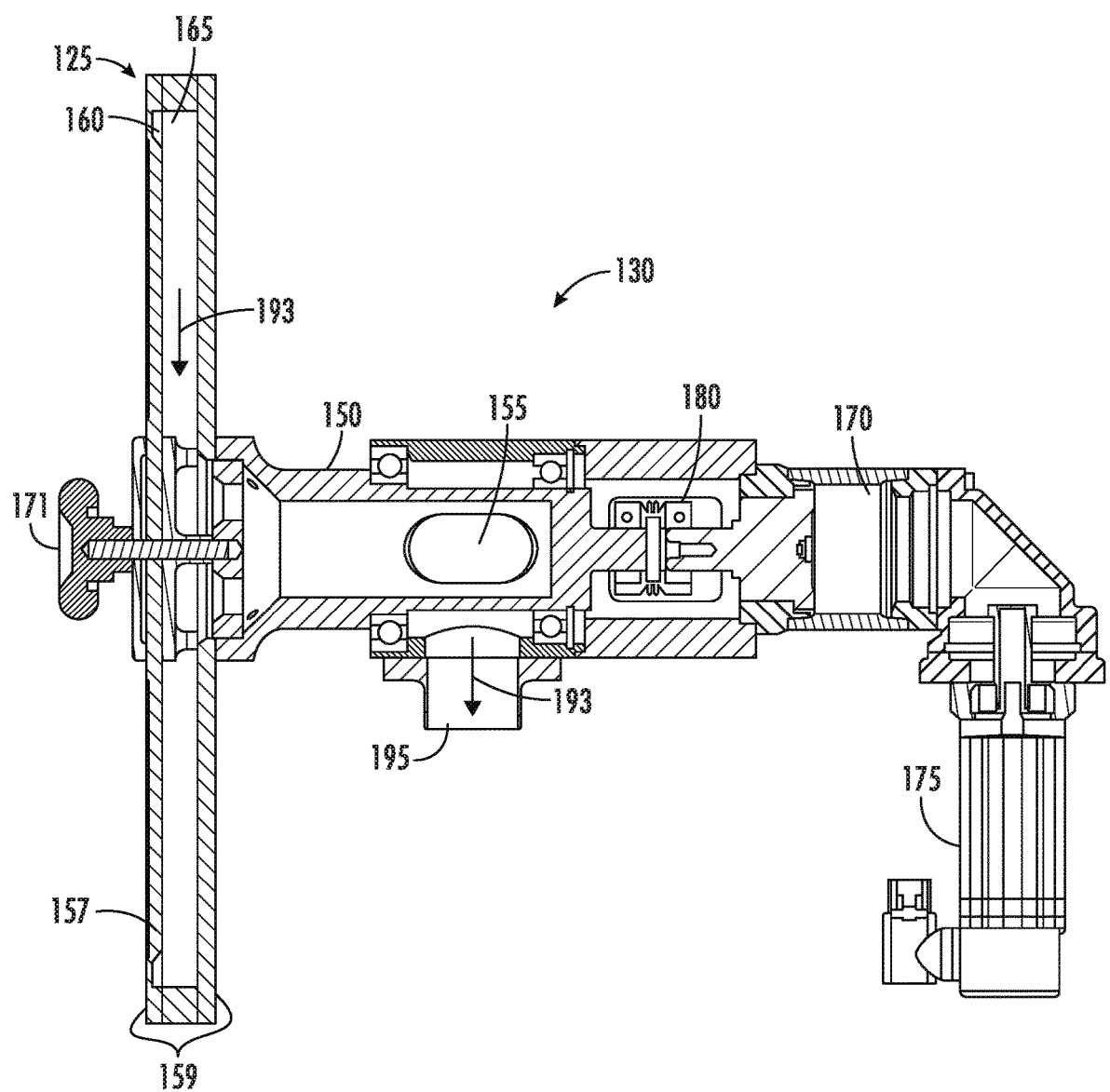
Figure 6:
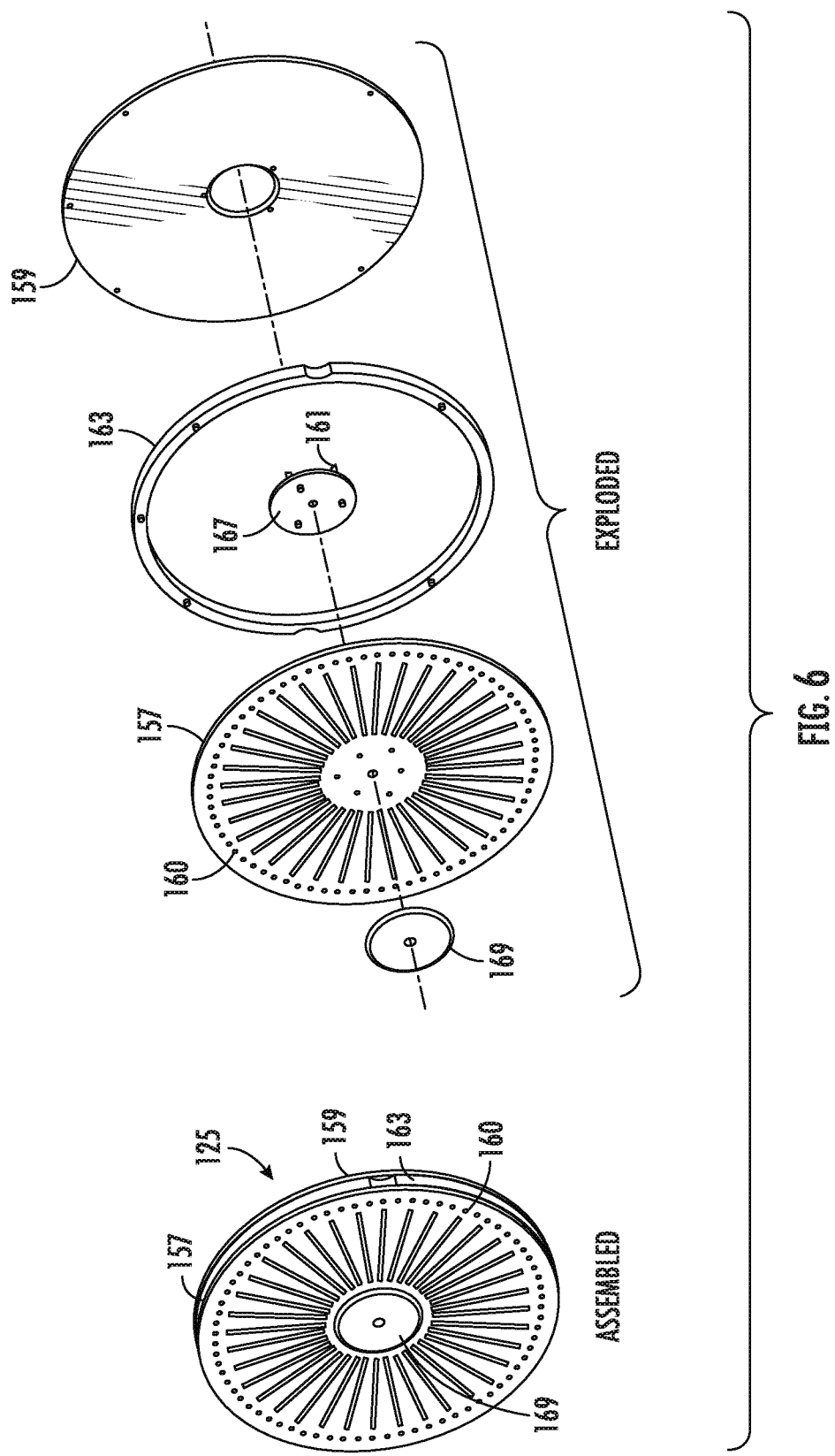
Figure 7:
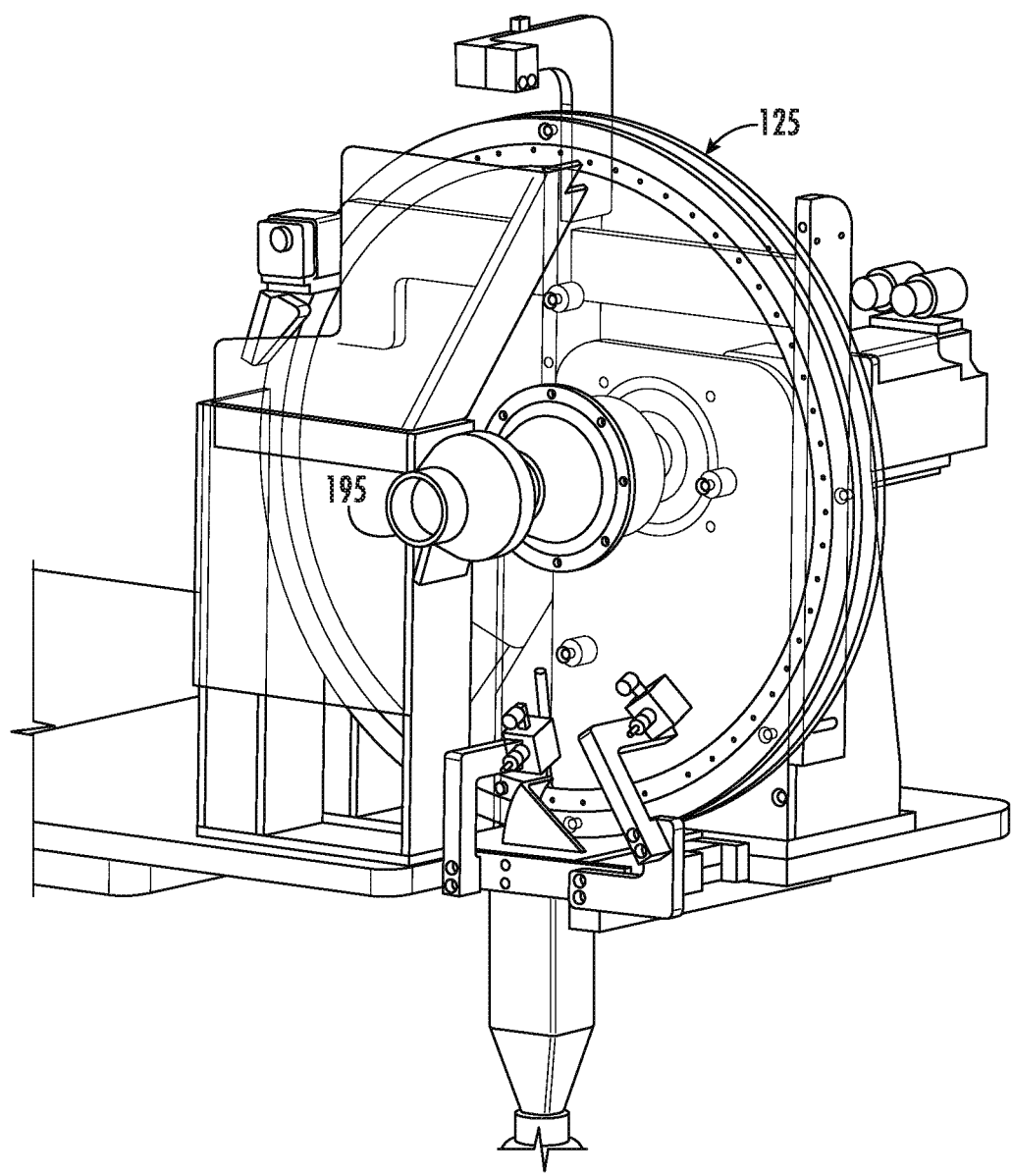
Figure 8A:
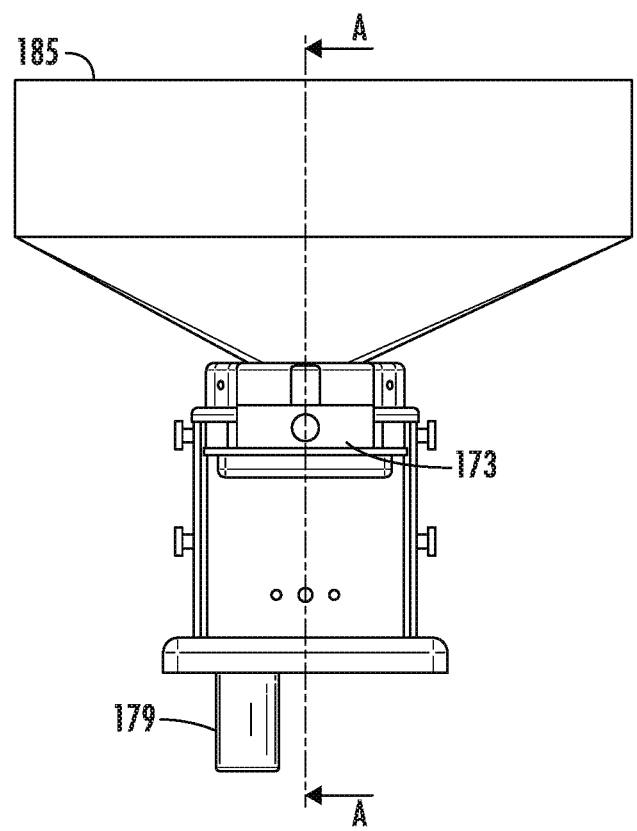
Figure 8B:
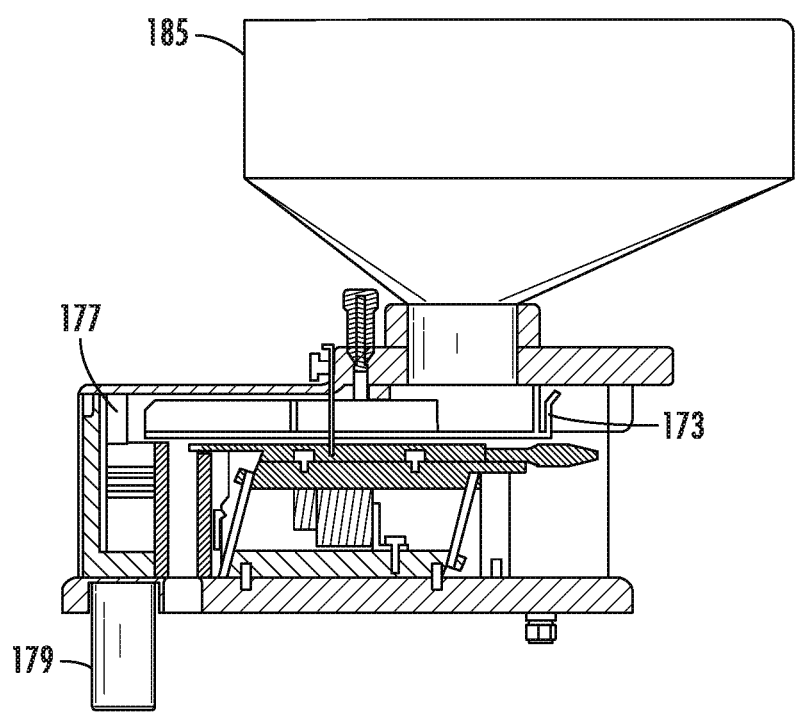
Figure 9:
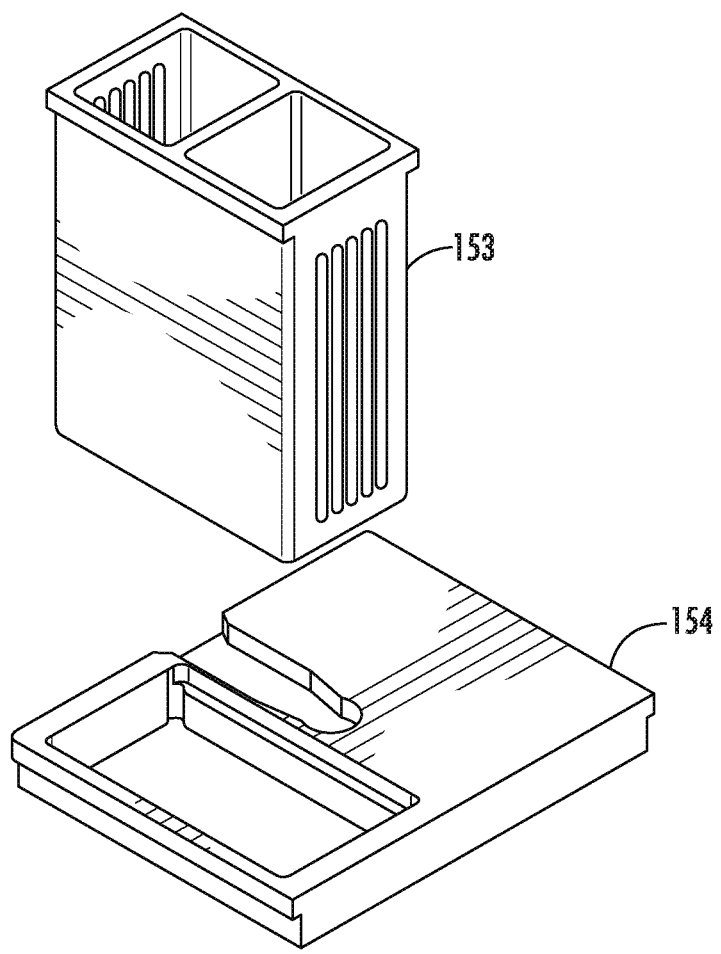
Figure 10A:
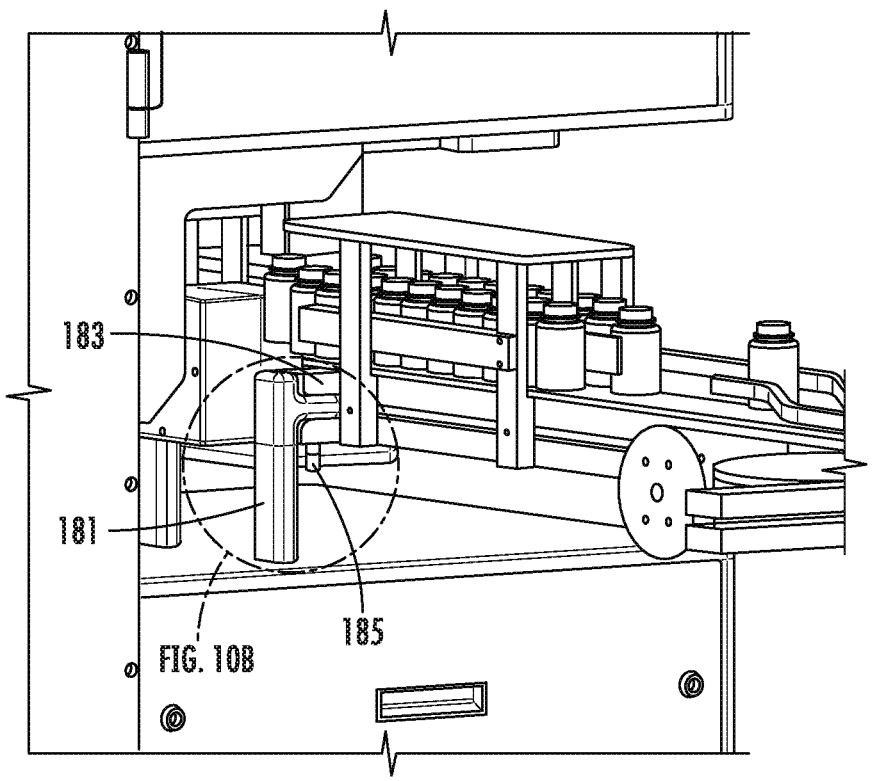
Figure 10B:
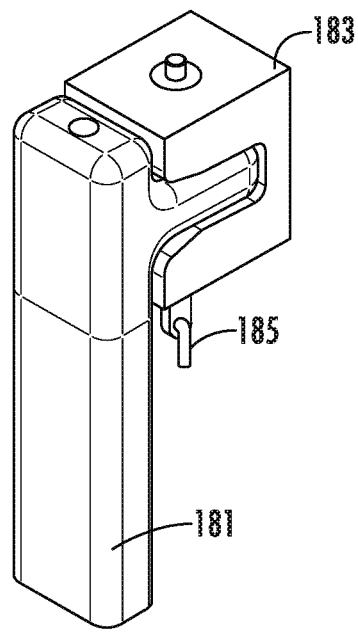

Having thus described the presently disclosed subject matter in general terms, reference will now be made to the accompanying Drawings, which are not necessarily drawn to scale, and wherein:

FIG. 1 illustrates a side view of an example of a tablet counter and packaging module in accordance with an embodiment of the invention;

FIG. 2 illustrates a perspective view of the tablet counter and packaging module in accordance with an embodiment of the invention;

FIG. 3 illustrates another side view of the tablet counter and packaging module in accordance with an embodiment of the invention;

FIG. 4 illustrates another perspective view of the tablet counter and packaging module in accordance with an embodiment of the invention;

FIG. 5 illustrates a side view of an example of a filling assembly of the tablet counter and packaging module in accordance with an embodiment of the invention;

FIG. 6 illustrates an assembled and exploded view of an example of a vacuum wheel assembly in accordance with an embodiment of the invention;

FIG. 7 illustrates a partial perspective view of the tablet counter and packaging module in accordance with another embodiment of the invention;

FIG. 8A illustrates a front view of an example of an upper portion of the tablet counter and packaging module in accordance with an embodiment of the invention;

FIG. 8B illustrates a cross-sectional view of the upper portion of the tablet counter and packaging module shown in FIG. 8A along line A-A, in accordance with an embodiment of the invention;

FIG. 9 illustrates a perspective view of an example exit chute and exit chute plate in accordance with an embodiment of the invention;

FIG. 10A illustrates a perspective view of an example docking head of the tablet counter and packaging module locked in place with a docking block of a bottle fill line in accordance with an embodiment of the invention;

FIG. 10B illustrates another perspective view of the docking head and docking block shown in 10A locked together in accordance with an embodiment of the invention; and FIG. 11 illustrates examples of different tablet characteristics of tablets that may be processed by the tablet counter and packaging module in accordance with an embodiment of the invention.

DETAILED DESCRIPTION

The subject matter of the invention now will be described more fully hereinafter with reference to the accompanying Drawings, in which some, but not all embodiments of the subject matter of the invention are shown. Like numbers refer to like elements throughout. The subject matter of the invention may be embodied in many different forms and should not be construed as limited to the embodiments set forth herein; rather, these embodiments are provided so that this disclosure will satisfy applicable legal requirements. Indeed, many modifications and other embodiments of the subject matter of the invention set forth herein will come to mind to one skilled in the art to which the subject matter of the invention pertains having the benefit of the teachings presented in the foregoing descriptions and the associated Drawings. Therefore, it is to be understood that the subject matter of the invention is not to be limited to the specific embodiments disclosed and that modifications and other embodiments are intended to be included within the scope of the appended claims.

In some embodiments, the subject matter of the invention provides a tablet counter and packaging module. The tablet counter and packaging module is a tablet counter and package system that may include certain advantages of some existing bottle fillers, but with little to no change tooling required, making the cost of operating and scaling more economical with the option of adding and linking multiple tablet counter and packaging modules in series to increase bottle per minute (bpm) packaging rates. In one non-limiting example, a single one of the presently disclosed tablet counter and packaging modules may preferably be capable of running about 60 bpm during a 100 count for a 5 mm diameter tablet. Adding additional tablet counter and packaging modules increase the bottles per minute, such as linearly.

The disclosed tablet counter and packaging module includes a number of advantages over other currently available systems. In one example advantage, the disclosed tablet counter and packaging module provides improved defective tablet detection (e.g., tablet chip, broken, doubles) before bottle fill, and 100%, or near 100%, count accuracy. If tablet chips and/or broken or otherwise defective tablets fall through the tablet verification sensors while filling the bottle, the entire bottle would have to be rejected. In another example advantage, the disclosed tablet counter and packaging module provides a built-in vision verification system. Tablet inspection is provided from multiple different perspectives (e.g., front and side) increasing the chances of detecting, for example, a doubles tablet, color discrepancy, defective tablet, unidentifiable tablet, or broken/chipped tablet. In yet another example advantage, the disclosed tablet counter and packaging module provides tablet reject on the fly. Unacceptable tablets may be removed from their vacuum hole location on the disc assembly before reaching a bottle fill ejection nozzle to prevent them from going into a good bottle. Another example advantage, a tablet verification sensor (e.g., tablet verification sensor 147) may verify a product/tablet made it into the intended destination (e.g., reject receptacle 148, bottle 149). In still yet another example advantage, the disclosed tablet counter and packaging module may require no or limited change tooling parts when switching, for example, between products and/or bottles, thereby providing for a quicker change over, requiring fewer change parts, thus allowing a complete changeover to be done in much less time as compared to other existing systems, for example in about five (5) minutes or less. In one example, an exit chute and vacuum disc (e.g., exit chute 153 and vacuum disc 157), may be the only change tooling parts necessary when switching between products and/or bottles, and may be able to be removed/replaced without requiring the use of tools. In one example, the exit chute may be slid into an exit chute plate (e.g., exit chute plate 154), that may slide and lock into place using, for example, one or more detents, or any other suitable mechanism or technique for securing the exit chute in place.

With reference to the figures, a tablet counter and packaging module 100 is disclosed. The tablet counter and packaging module 100 may include a bulk product conveyor (BPC) 105, one or more cameras (preferably at least two (2), e.g., a first camera 110 and a second camera 115), a primary hopper 120, a disc assembly 125, a filling assembly 130, one or more removal nozzles 135, one or more reject nozzles 140, one or more eject nozzles 145, and one or more tablet verification sensors 147 (e.g., one for each bottle fill lane).

In one example, the one or more removal nozzles 135 may be configured to remove tablet multiples (e.g., double tablets at an individual vacuum hole), and the one or more reject nozzles 140 may be configured to remove tablets that are, for example, defective, unidentifiable, has color discrepancy, broken, are tablet chips, or other deformity or undesired condition/characteristic. The one or more eject nozzles 145 may be configured to eject a good tablet into a respective bottle container 149. In an embodiment a bottle fill line, e.g., bottle fill line 151, may include multiple bottle lanes, e.g., a lane 1 and lane 2, in such a two lane embodiment there may preferably be two eject nozzles 145, e.g., a first one aligned with lane 1 and a second one aligned with lane 2.

Referring to FIGS. 5 and 6, filling assembly 130 may include the disc assembly 125, a shaft 150, and a rotary union 155. Disc assembly 125 may include one or more vacuum covers 159 and a vacuum disc 157. The vacuum disc 157 may be held to the disc assembly 125 using dowel pins 161, or other suitable mechanism or technique. The disc assembly 125 may form a vacuum chamber 165 therein. The vacuum disc 157 may further include a plurality of individual tablet apertures, e.g., vacuum holes 160, formed therein. The individual vacuum holes 160 may be in fluid communication with the vacuum chamber 165 and may act as tablet receptacles. Whereby a tablet may be pulled into (or partially into) individual vacuum holes 160 (preferably one tablet per vacuum hole 160), by the negative pressure at the vacuum hole 160 via the vacuum chamber 165 created by a vacuum 197 in a vacuum section 190. In one non-limiting example, vacuum 197 may be a ring compressor, or any other suitable mechanism capable of creating the necessary negative pressure at the individual vacuum holes 160.

In one embodiment, the disc assembly 125 may further include one or more of, a vacuum spacer plate 163 disposed between at least one of the one or more vacuum covers 159 and the vacuum disc 157, and may further include one or both of a vacuum inner spacer 167 and a sealing plate 169. In one example, disc assembly 125 may be held to the shaft 150 using, for example, a hand knob 171. In such an example, disc assembly 125 may be removed by removing the hand knob 171, thereby allowing the disc assembly 125 to be removed from the shaft 150 without requiring any tools. Hand knob 171 is just one non-limiting example of a mechanism for holding/attaching disc assembly 125 to the shaft 150, and any other suitable mechanism or technique may alternatively be employed in place of hand knob 171.

Different disc assemblies 125 may have different vacuum discs 157 having a different number of and/or size and/or spacing of individual vacuum holes 160 to accommodate different size tablets and/or production needs. In one non-limiting embodiment, the individual vacuum holes 160 may be evenly spaced in a single row around a periphery of a surface of the vacuum disc 157. In one non-limiting example, a tablet counter and packaging module 100 running 60 bpm during a 100 count for a 5 mm diameter tablet, may include a vacuum disc 157 having vacuum holes 160 with about a 4 degree spacing, and rotating at a rotational speed of about 35 rpm. In such an example, the tablet counter and packaging module 100 may have about a 97% fill efficiency, and may further may be set to skip filling a set number (e.g. about two) vacuum holes 160 between bottle fills. Further, vacuum disc 157 may be configured as a two-sided wheel, and may have vacuum holes 160 formed on both surfaces of the vacuum disc 157.

Referring again to FIG. 5, shaft 150 may be solid, hollow, or partially hollow, and configured to engage disc assembly 125 to provide rotational movement of at least vacuum disc 157. The shaft 150 may be further connected to a gearbox 170 and/or a motor 175 by, for example, a coupling 180.

In operation, bulk product, e.g., tablets, may be placed in a load hopper 185 that feeds into the BPC 105, by for example gravity feed. The tablets may then be dispensed from the BPC 105 into the primary hopper 120. With reference to FIG. 8, in one embodiment, the BPC 105 may further include a vibratory tray 173, and as tablets in the primary hopper 120 get below a set level, the vibratory tray 173 vibrates in the BPC 105 and vibrates the tablets forward until they reach a BPC discharge funnel 177 where the tablets may then fall down, e.g., through tubing 179, into the primary hopper 120.

The primary hopper 120 is configured as a staging area for the tablets before they are pulled into individual vacuum holes 160 formed in the vacuum disc 157 of disc assembly 125. The individual vacuum holes 160 may be sized such that they are substantially the same size or smaller than the size of the particular tablets being packaged, thereby preventing the tablets from being sucked through the individual vacuum holes 160 and into the vacuum chamber 165. As the individual vacuum holes 160 of the vacuum disc 157 rotate by the tablets in the primary hopper 120, individual tablets are pulled into the individual vacuum holes 160 due to negative pressure in the vacuum chamber 165 caused by the vacuum 197 in the vacuum section 190.

Again with reference to FIG. 5, arrows 193 illustrate a general example of flow of air though the filling assembly 130. In one embodiment, the air may flow in through the plurality of individual vacuum holes 160 into the vacuum chamber 165 of the disc assembly 125. The air may further flow through the vacuum chamber 165 and down the center of, or around, the shaft 150 to the rotary union 155, then out of the filling assembly 130 through an air outlet 195. While air is traveling along the center of, or around, the shaft 150, the rotary union 155 allows the shaft 150 to rotate while allowing the air to exit the filling assembly 130 through air outlet 195, and to the vacuum 197 in the vacuum section 190. In an alternative embodiment, the filling assembly may be configured such that the air outlet 195 may be located at a front of the disc assembly 125 (as shown in FIG. 7), and air may be pulled out of the air outlet 195 located at the front of the disc assembly 125 to create the vacuum, instead of the air being pulled through the rotary union 155.

As the vacuum disc 157 of the disc assembly 125 rotates, for example in a clockwise direction (or alternatively a clockwise direction), tablets from the primary hopper 120, may be pulled into the individual vacuum holes 160 (preferably one tablet per vacuum hole 160), and therefore picked up by the vacuum disc 157 of the disc assembly 125. As the vacuum disc 157 of the disc assembly 125 rotates, with tablets in the vacuum holes 160, the picked up tablets are positioned, preferably, to pass in front of the one or more cameras, e.g., first camera 110 and/or second camera 115. First camera 110 and second camera 115 may be a combination of a front camera and side camera, front camera and rear camera, rear camera and side camera, or any other combination of positioning thereof. Both first camera 110 and second camera 115 take photographs of, or image, every individual vacuum hole 160 location on disc assembly 125. In one non-limiting example, one or more of first camera 110 and/or second camera 115 may be color. During set up, several pictures may be taken of the tablets to be run in natural orientation (i.e., how the tablets may naturally get picked up by the vacuum disc 157). The colors may also sampled by the vision system and/or the sizes of tablets in various noticeably different orientations (e.g., laying down—longest dimension parallel with wheel surface, standing up—longest dimension perpendicular to wheel surface, or somewhere in between), may be recorded and set as the expected size for the various orientations of the tablets being run. At least one of the first camera 110 or second camera 115 may determine the 3D dimension size of the tablet, which assist with determining the orientation.

After each photograph/image is captured, it is processed. The captured photographs/images may first be analyzed for orientation, then the color and size may be checked against the control for those orientations. The photographs/images may further be analyzed for materials with colors not matching the wheel or that of the product being run to be present (foreign material). The image may be processed to determine if the individual vacuum hole 160 is one of empty; has a tablet that is, for example, defective, broken, unidentifiable, or a chip; has more than one (1) tablet (doubles/more); or has a single good tablet. (Various non-limiting example tablet scenarios are shown in FIG. 11).

With reference back to FIGS. 3, 4, and 9, as one of the individual vacuum holes 160 approaches the removal nozzle 135, after first passing by first camera 110 and second camera 115, the captured images of the individual vacuum hole 160 will have preferably been processed, and if it is determined that individual vacuum hole 160 includes more than a single tablet (e.g., doubles or more), the tablet(s) will be removed from the individual vacuum hole 160 they occupy by the removal nozzle 135, and be directed back into the primary hopper 120, and available to be picked up once again by the vacuum disc 157 of the disc assembly 125 as it rotates. If it is determined that the individual vacuum hole 160 does not include multiple tablets, the individual vacuum hole 160 will rotate past the removal nozzle 135 location. However, if the vision system determines that the individual vacuum hole 160 includes a defective or unidentifiable tablet (unacceptable tablet), it will be removed at the reject nozzle 140 location, and discarded into an area separate from the primary hopper 120, such as a rejected tablet receptacle 148, so that the unacceptable tablet does not get picked up again by the vacuum disc 157 of the disc assembly 125. If the vision system determines that the individual vacuum hole 160 includes a single good tablet (acceptable tablet), the tablet will be removed by one of the one or more eject nozzles 145 at, for example, an exit chute 153 and into the appropriate bottle 149 fill location, e.g., lane 1 or lane 2 of a bottle fill conveyor of a bottle fill line 151, depending on the tablet count per bottle.

The tablets may be removed by the one or more of the removal nozzle 135, reject nozzle 140, and/or the eject nozzle 145 using air, for example in one non-limiting example, using a fast acting pneumatic solenoid valve with the air exiting the nozzle of the removal nozzle 135, reject nozzle 140, and/or eject nozzle 145. The force from the fast moving air exiting the nozzles is sufficient to overcome the negative pressure created at the vacuum hole 160 by the vacuum 197, and thus ejecting the tablet from its individual vacuum hole 160 and removing it from the vacuum disc 157 of the disc assembly 125, and into its respective receptacle, e.g., back to primary hopper 120, rejected tablet receptacle 148, or bottle 149. In one non-limiting example, the air exiting one or more of the removal nozzle 135, reject nozzle 140, and/or eject nozzle 145 may be in the range of about 25-40 psi, or any other suitable pressure required to overcome the negative pressure created at the vacuum hole 160. The nozzle orifices may be in the range of about $3/32$ of an inch, or any other suitable dimension. In an alternative embodiment tablets may be removed from their respective the vacuum holes 160 mechanically or by any other suitable mechanisms or techniques.

In one example embodiment, the tablet counter and packaging module 100 may sit on a moveable platform 198, which may include, for example, castors/wheels 199 (as shown in FIGS. 1 and 2), allowing for the entire tablet counter and packaging module 100 to be easily moved as a whole module with little to no disassembly or modification. Thereby allowing the tablet counter and packaging module 100 to be, for example, easily added to a bottle packaging line and/or moved from one bottle packaging line 151 to another bottle packaging line 151. The moveable platform 198 is not limited to having castors/wheels 199, but may be any other suitable mechanism or technique that allows for the tablet counter and packaging module 100 to be easily moved as a whole.

Further, multiple tablet counter and packaging modules 100 may be installed on a tablet packaging line, for example linearly, to increase the bottle per minute rate and thereby increasing speed and capacity.

In one embodiment, to add one or more tablet counter and packaging modules 100 to a bottle fill line 151, the one or more tablet counter and packaging modules 100 to be added to the bottle fill line 151 are moved and positioned into place. For example, the one or more tablet counter and packaging modules 100 may be moved into the correct place on the bottle fill line 151 via moveable platform 198, which may include castors/wheels 199. With reference to FIGS. 10A and 10B, in one embodiment, tablet counter and packaging module 100 may include a docking head 181 that is configured to engage with a docking block 183 of the bottle fill line 151. Docking block 183 is preferably positioned on the bottle fill line 151, such that when the docking head 181 of the tablet counter and packaging module 100 is engaged therewith, it ensures the tablet counter and packaging module 100 is in the correct position for tying into the bottle fill line 151. In one example, docking head 181 may be locked in place with the docking block 183 using a locking mechanism 187, such as a T-handle; however, any other suitable mechanism or technique may be used to lock the docking head 181 in place with the docking block 185.

The tablet counter and packaging module 100 of the present disclosure provides an easily scalable high speed tablet counter with 100%, or near 100%, count accuracy.

The tablet counter and packaging module 100 of the present disclosure is capable of rejecting doubles and/or defective or unidentifiable tablets on the fly without slowing down, has a small footprint, and is economically affordable compared to other similar systems.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A tablet counter and packaging module comprising:
   a. a rotary disc rotatable in a rotational direction about a first axis extending through a center thereof, the rotary disc comprising tablet apertures spaced about a peripheral surface of the rotary disc, each of the tablet apertures being configured to receive a tablet from a plurality of tablets disposed adjacent to the peripheral surface of the rotary disc;
   b. a negative pressure system operably engaged with the rotary disc and in fluid communication with one or more of the tablet apertures, the negative pressure system configured to apply a negative pressure to the one or more tablet apertures so as to retain the tablets therein as the rotary disc rotates about the first axis;
   c. a plurality of ejection devices, each ejection device being operably engaged with the rotary disc and configured to be in communication with the tablet apertures thereof at a respective angular position so as to selectively eject one or more of the tablets from the corresponding tablet apertures outwardly at the respective angular position of the ejection device;
   d. a plurality of ejection receptacles configured to collect the tablets ejected by respective ones of the ejection devices from the plurality of tablet apertures of the rotary disc;
   e. an inspection system, comprising one or more inspection devices operably engaged with the rotary disc and at least one of the ejection devices, each of the one or more inspection devices being configured to analyze each of the tablets retained within the plurality of tablet apertures, wherein analyzing a tablet comprises determining one or more tablet characteristics associated with the tablet; and
   wherein the ejection devices are configured to selectively eject the analyzed tablet from a corresponding tablet aperture of the rotary disc based at least in part on the at least one tablet characteristics associated with the tablet.

2. The tablet counter and packaging module of claim 1, wherein the plurality of ejection devices comprises:
   a. a first ejection device configured to be in communication with the tablet apertures at an angular position of the rotary disc so as to selectively eject one or more of the tablets from the corresponding tablet aperture; and
   b. a second ejection device configured to be in communication with the tablet apertures at an angular position of the rotary disc spaced from the first ejection device so as to selectively eject one or more of the tablets from the corresponding tablet aperture;
   c. a third ejection device configured to be in communication with the tablet apertures at an angular position of the rotary disc spaced from the first and second ejection devices so as to selectively eject one or more of the tablets from the corresponding tablet aperture; and
   wherein the one or more inspection devices are disposed at an angular position being rotationally upstream from the first, second, and third ejection devices, and wherein the ejection devices are configured to selectively eject one or more of the tablets based at least in part on the at least one tablet characteristics respectively associated with each of the one or more tablets.

3. The tablet counter and packaging module of claim 2, wherein the at least one tablet characteristic comprises a first tablet characteristic, a second tablet characteristic, and a third tablet characteristic, and wherein the first ejection device is configured to eject tablets comprising the first tablet characteristic, the second ejection device is configured to eject tablets comprising the second tablet characteristic, and the third ejection device is configured to eject tablets comprising the third tablet characteristic.

4. The tablet counter and packaging module of claim 3, wherein the first tablet characteristic comprises a first unacceptable tablet characteristic, the second tablet characteristic comprises a second unacceptable tablet characteristic, and the third tablet characteristic comprises an acceptable tablet characteristic; wherein a tablet is associated with the first unacceptable tablet characteristic based on a determination by the inspection system that the tablet comprises multiple tablets in a single tablet aperture, wherein a tablet is associated with the second unacceptable tablet characteristic based on a determination by the inspection system that the tablet comprises one or more of a defective, unidentifiable, broken, or tablet chip tablet characteristic, and wherein a tablet is associated with the acceptable tablet characteristic based at least in part on a determination by the inspection system that the tablet does not comprise any of the first or second unacceptable tablet characteristics.

5. The tablet counter and packaging module of claim 3, further configured to count a number of tablets ejected from the plurality of ejection devices comprising the first tablet characteristic, a number of tablets ejected from the plurality of ejection devices comprising the second characteristic, and a number of tablets ejected from the plurality of ejection devices comprising the third characteristic.

6. The tablet counter and packaging module of claim 2, wherein the plurality of ejection receptacles comprise a collection mechanism, the collection mechanism being configured to collect the tablets ejected by the third ejection device and to direct the tablets toward a single one of a series of containers for deposition therein.

7. The tablet counter and packaging module of claim 6, further comprising a tablet verification sensor configured to verify a tablet ejected by the third ejection device was deposited in its intended container.

8. The tablet counter and packaging module of claim 2, wherein the plurality of ejection receptacles comprise at least one reject container, the reject container being configured to collect a tablet ejected by the second ejection device.

9. The tablet counter and packaging module of claim 2, wherein at least one of the plurality of ejection receptacles is configured to direct at least a tablet ejected by the first ejection device back to the plurality of tablets disposed adjacent to the peripheral surface of the rotary disc.

10. The tablet counter and packaging module of claim 2, wherein the rotary disc is configured such that the plurality of tablet apertures are arranged in a row about an outer peripheral surface portion thereof.

11. The tablet counter and packaging module of claim 2, wherein the negative pressure system is configured to simultaneously apply a negative pressure to the plurality of tablet apertures located at least between the one or more inspection devices and the first, second, and third ejection devices so as to retain the tablets therein, as the rotary disc rotates about the first axis.

12. The tablet counter and packaging module of claim 2, wherein each of the ejection devices is in communication with at least one of the plurality of tablet apertures about a respective angular position and configured to receive positively pressurized air and to selectively emit the air to the tablet apertures of the rotary disc at the respective angular position, the air being emitted at a positive pressure capable of overcoming the negative pressure retaining the tablets within the plurality of tablet apertures, so as to selectively eject one or more of the tablets from the corresponding tablet apertures toward the ejection receptacle disposed about the respective angular position corresponding to the ejection device.

13. The tablet counter and packaging module of claim 2, further comprising at least one counting device, wherein both the at least one counting device and the inspection system are configured to count a number of tablets ejected from the plurality of ejection devices so as to verify that the number of tablets ejected from the plurality of ejection devices matches a predetermined amount of tablets to be selectively deposited into one or more containers.

14. The tablet counter and packaging module of claim 1, wherein the first axis is substantially horizontally disposed, and wherein the tablet counter and packaging module is further configured to deliver a selected amount of tablets to at least one container via the ejection receptacles, the at least one container being moved into coincidence with an ejection receptacle of the plurality of ejection receptacles by a conveying device.

15. The tablet counter and packaging module of claim 1, wherein the tablet counter and packaging module is configured to operate as a single module or linearly with one or more additional tablet counter and packaging modules.

16. The tablet counter and packaging module of claim 1, wherein the tablet counter and packaging module is disposed on a movable platform configured for allowing movement of the tablet counter and packaging module as a whole.

17. A method of using a tablet counter and packaging module, comprising:
   a. receiving a tablet in at least one tablet aperture of a plurality of tablet apertures defined about a peripheral surface of a rotary disc configured to rotate in a rotational direction about a first axis extending through a center thereof, each of the plurality of tablet apertures being configured to receive a tablet from a plurality of tablets disposed adjacent to the peripheral surface of the rotary disc;
   b. applying a negative pressure to the plurality of tablet apertures with a negative pressure system operably engaged with the rotary disc and in fluid communication with one or more of the tablet apertures, the negative pressure system configured to apply a negative pressure to the one or more tablet apertures so as to retain the tablets therein as the rotary disc rotates about the first axis;
   c. analyzing each tablet respectively retained within the at least one tablet aperture to determine one or more tablet characteristic associated with the tablet;
   d. selectively ejecting a tablet from a corresponding tablet aperture of the rotary disc based at least in part on one or more tablet characteristics associated with the tablet, the tablet being ejected by at least one ejection device of a plurality of ejection devices, the at least one ejection device being operably engaged with the peripheral surface portion of the rotary disc and configured to be in communication with at least one of the tablet apertures about a respective angular position;
   e. collecting the tablets ejected from the plurality of tablet apertures of the rotary disc with a plurality of ejection receptacles configured to direct the tablets toward one or more containers of a series of containers for deposition therein; and
   f. determining at least a portion of an amount of tablets ejected by each of the plurality of ejection devices.

18. The method of claim 17, wherein selectively ejecting a tablet from a corresponding tablet aperture based at least in part on one or more tablet characteristics associated with the tablet comprises:
   a. selectively ejecting a tablet determined to comprise a first tablet characteristic from a corresponding tablet aperture by a first ejection device of the plurality of ejection devices, the first ejection device configured to be in communication with the tablet apertures about the respective angular position;

b. selectively ejecting a tablet determined to comprise a second tablet characteristic from a corresponding tablet aperture by a second ejection device of the plurality of ejection devices, the second ejection device configured to be in communication with the tablet apertures at the respective angular position;

c. selectively ejecting a tablet determined to comprise a third tablet characteristic from a corresponding tablet aperture by a third ejection device of the plurality of ejection devices, the third ejection device configured to be in communication with the tablet apertures at the respective angular position; and wherein the at least one tablet characteristic comprises a first tablet characteristic, a second tablet characteristic, and a third tablet characteristic, wherein tablets comprising the first tablet characteristic are ejected by the first ejection device, tablets comprising the second tablet characteristic are ejected by the second ejection device, and tablets comprising the third tablet characteristic are ejected by the third ejection device.

19. The method of claim 18, wherein the at least one tablet characteristic is determined by an inspection system, and the first tablet characteristic comprises a first unacceptable tablet characteristic, the second tablet characteristic comprises a second unacceptable tablet characteristic, and the third tablet characteristic comprises an acceptable tablet characteristic; wherein a tablet is associated with the first unacceptable tablet characteristic based on a determination by the inspection system that the tablet comprises multiple tablets in a single tablet aperture, wherein a tablet is associated with the second unacceptable tablet characteristic based on a determination by the inspection system that the tablet comprises one or more of a defective, unidentifiable, broken, or tablet chip tablet characteristic, and wherein a tablet is associated with the acceptable tablet characteristic based at least in part on a determination by the inspection system that the tablet does not comprise any of the first or second unacceptable tablet characteristics.

20. The method of claim 19, wherein the plurality of ejection receptacles comprise at least one collection mechanism, the at least one collection mechanism being configured to collect the tablets ejected by the third ejection device and to direct the tablets toward a single one of the series of containers for deposition therein.

21. The method of claim 20, further comprising verifying, via a tablet verification sensor that the tablets ejected by the third ejection device were deposited in their intended container.

22. The method of claim 19, wherein the plurality of ejection receptacles comprise at least one collection mechanism, the at least one collection mechanism being configured to collect the tablets ejected by the second ejection device and to direct the tablets toward a reject container for deposition therein.

23. The method of claim 19, wherein the plurality of ejection receptacles comprise at least one collection mechanism, the at least one collection mechanism being configured to direct the tablets ejected by the first ejection device back to the plurality of tablets disposed adjacent to the peripheral surface of the rotary disc.

24. The method of claim 18, wherein receiving a tablet in at least one tablet aperture of the plurality of tablet apertures comprises receiving at least one tablet in a plurality of tablet apertures defined in a row about an outer peripheral surface portion of the rotary disc.

25. The method of claim 18, wherein applying a negative pressure to the plurality of tablet apertures further comprises simultaneously applying a negative pressure to the plurality of tablet apertures with the negative pressure system located at least between one or more inspection devices and the first, second, and third ejection devices, wherein the one or more inspection devices are disposed upstream from the first, second, and third ejection devices.

26. The method of claim 18, wherein selectively ejecting a tablet of the at least one tablets from a corresponding tablet aperture comprises receiving positively pressurized air at an ejection device in communication with at least one of the tablet apertures about a respective angular position, and selectively emitting the air to at least one of the tablet apertures at the respective angular position, the air being emitted at a positive pressure capable of overcoming the negative pressure retaining the tablets within the plurality of tablet apertures, so as to selectively eject one or more of the tablets from the corresponding tablet aperture toward an ejection receptacle disposed about the respective angular position corresponding to the ejection device.

27. The method of claim 17, further comprising adding one or more additional tablet counter and packaging modules linearly to a bottle fill line.

28. The method of claim 17, wherein the tablet counter and packaging module is disposed on a movable platform configured for allowing movement of the tablet counter and packaging module as a whole.

\* \* \* \* \*